United States Patent

Stasik et al.

[11] Patent Number: 5,819,191
[45] Date of Patent: Oct. 6, 1998

[54] ADAPTIVE PULL-AWAY RATIO SELECTION

[75] Inventors: Anthony Stasik, Coppull; John Ernest Stainton, Chorley, both of England

[73] Assignee: Eaton Corporation, Cleveland, Ohio

[21] Appl. No.: 511,122

[22] Filed: Aug. 4, 1995

[30] Foreign Application Priority Data

Aug. 6, 1994 [GB] United Kingdom .................. 9415968

[51] Int. Cl.$^6$ ............................................. G06G 7/70
[52] U.S. Cl. ........................... 701/52; 701/51; 477/78; 477/144
[58] Field of Search ................. 364/424.081, 424.094, 364/424.097, 424.086, 424.095, 424.091, 424.082, 424.087, 424.083; 477/78, 144, 86, 176, 108, 906, 901, 120, 131, 123, 121; 192/3.3, 3.31, 3.29; 74/335, 336 R, 565; 701/51, 52, 53, 64; 475/158, 208, 256

[56] References Cited

U.S. PATENT DOCUMENTS

| | | | |
|---|---|---|---|
| 4,018,316 | 4/1977 | McQuinn et al. | 477/30 |
| 4,082,011 | 4/1978 | McQuinn et al. | 477/30 |
| 4,111,073 | 9/1978 | Chang | 477/41 |
| 4,122,732 | 10/1978 | Chang | 477/69 |
| 4,263,822 | 4/1981 | Harmon | 477/64 |
| 4,621,495 | 11/1986 | Hedlund | 60/447 |
| 4,648,290 | 3/1987 | Dunkley et al. | 477/78 |
| 4,662,243 | 5/1987 | Kanai et al. | 74/718 |
| 4,735,109 | 4/1988 | Richards et al. | 74/745 |
| 4,930,078 | 5/1990 | Dunkley et al. | 701/52 |
| 5,109,730 | 5/1992 | Zahn et al. | 477/121 |
| 5,233,525 | 8/1993 | Overmann et al. | 701/55 |
| 5,293,316 | 3/1994 | Slicker | 364/424.097 |

FOREIGN PATENT DOCUMENTS

| | | |
|---|---|---|
| 0269772 | 6/1988 | European Pat. Off. . |
| 0602685 | 6/1994 | European Pat. Off. . |
| 2532008 | 2/1977 | Germany . |

*Primary Examiner*—Jacques H. Louis-Jacques
*Attorney, Agent, or Firm*—Howard D. Gordon

[57] ABSTRACT

A control and control method for a semi-automatic mechanical transmission system (10) is provided for sensing operator request for a direct downshift into an optimum pull-away ratio and for automatically determining and engaging the optimum pull-away ratio. The optimum pull-away ratio ($GR_{PULL-AWAY}$) is adaptively selected as a function of throttle position ($THL > REF_{THL}$).

2 Claims, 4 Drawing Sheets

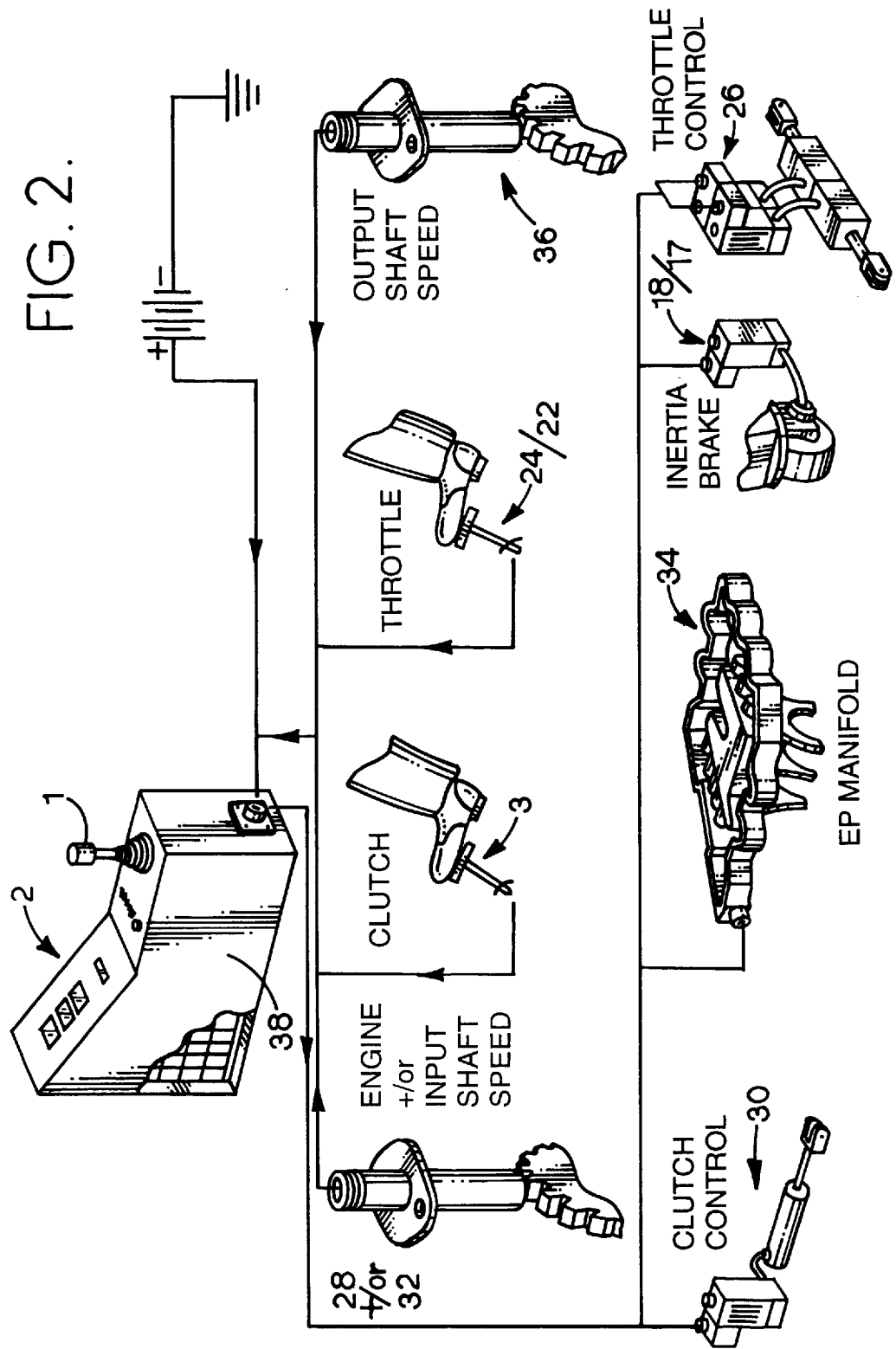

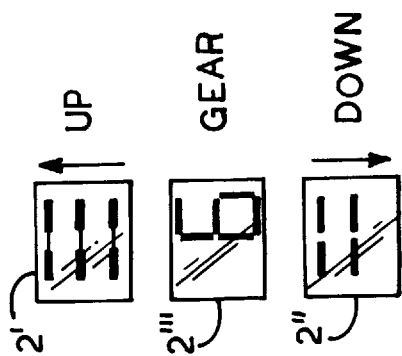
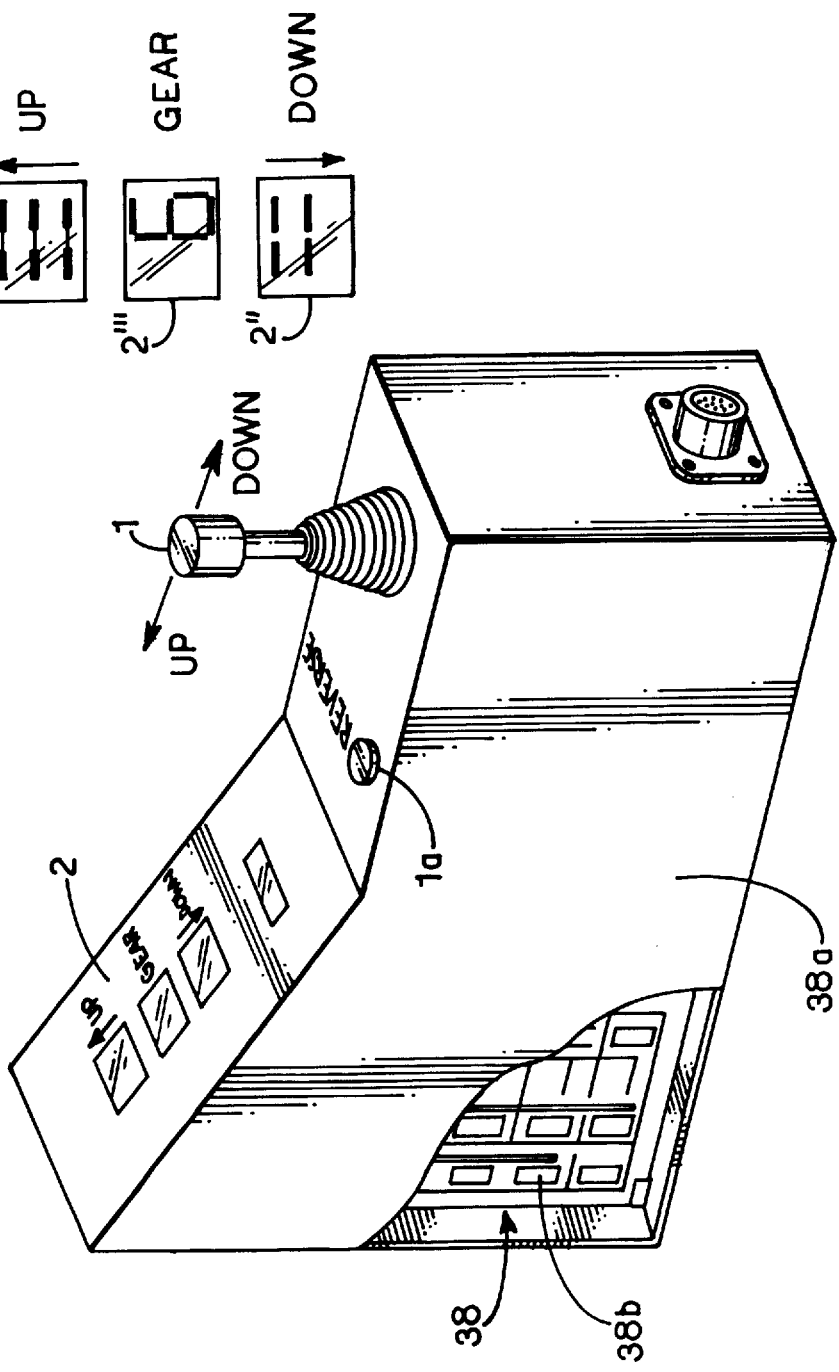

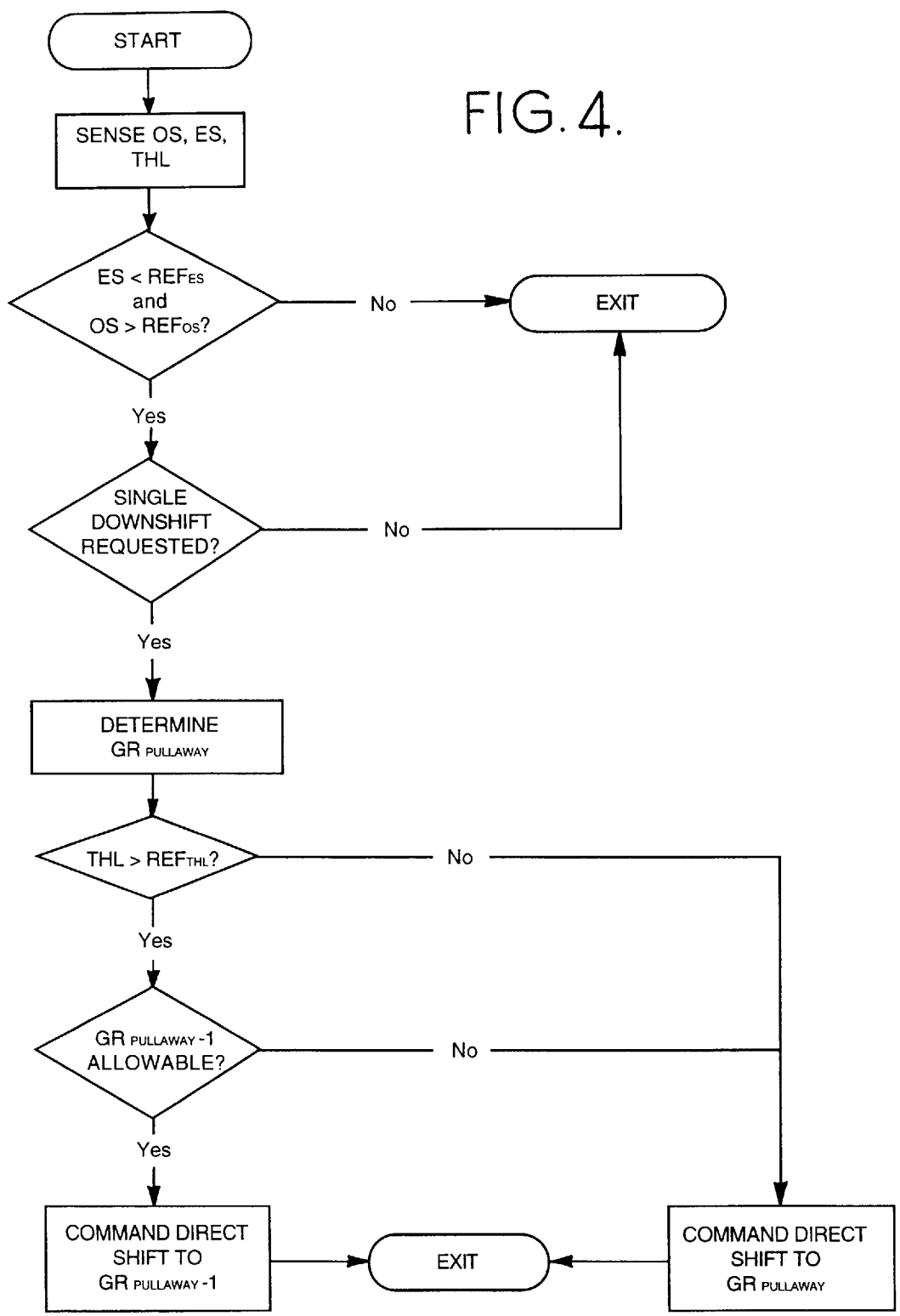

ADAPTIVE PULL-AWAY RATIO SELECTION

BACKGROUND OF THE INVENTION

Related Applications

This application claims priority from GB 9415968.8, filed Aug, 6, 1994.

1. Field of the Invention

The present invention relates to a control system and method for the semi-automatic control of a mechanical change gear transmission including means for automatically executing automatically determined and displayed allowable driver selected transmission ratio shifts. In particular, the present invention relates to a method of controlling a semi-automatic mechanical transmission wherein a single downshift request made at a time when the vehicle is in motion and engine speed is below a predetermined reference engine speed is interpreted as a request for a downshift into a pull-away transmission ratio providing an engine speed approximately equal to the midpoint between maximum governed engine speed and peak torque engine speed. More particularly, the present invention relates to a control wherein the pull-away ratio is adaptively determined by the current fueling, or operator request for fueling, of the engine.

2. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Examples of such transmissions may be seen be reference to U.S. Pat. Nos. 3,961,546; 4,081,065 and 4,361,060, the disclosures of which are incorporated herein by reference.

Semi-automatic mechanical transmission controls are known wherein automatic changing between a plurality of gear ratios is provided while normally permitting the driver to choose when to make a particular gear ratio change, whether to select the immediately consecutive ratio up or down or to skip one or more ratios, and when to slip (i.e., to incompletely engage) the vehicle master clutch in a low or crawler gear. Furthermore, the semi-automatic control system prohibits engagement of a driver selected higher ratio, i.e. an upshift, that would cause the engine speed to decrease below the idle speed (i.e., would cause stalling and/or over-stressing at low speeds of the engine) and of a lower ratio (i.e., a downshift) if such a change would cause overspeeding of the engine. Examples of such semi-automatic transmission controls may be seen by reference to U.S. Pat. No. 4,648,290, the disclosure of which is incorporated herein by reference.

The prior art semi-automatic mechanical transmission control included a control and control method which, if the vehicle is in motion and engine speed in the currently engaged gear ratio has fallen to below an acceptable reference value, will interpret, and if allowable will execute, a single movement of the control lever in the downshift direction as a request for a downshift directly into a pull-away gear ratio which, at current vehicle speed, will result in an engine speed midway between maximum (governed) engine speed and peak torque engine speed. In a typical diesel engine, the reference value will be about 800 to 1200 RPM, while the desired or target engine speed after the downshift will be about 1700 to 1800 RPM to provide a smooth yet powerful pull-away for a vehicle slowed by traffic and/or terrain. The control and the advantages thereof may be appreciated by reference to U.S. Pat. No. 4,930,078, the disclosure of which is incorporated herein by reference.

SUMMARY OF THE INVENTION

In accordance with the present invention, the semi-automated transmission control of the prior art is improved by adaptively selecting the pull-away ratio on the basis of the driver's intentions as surmised by throttle pedal position. If the driver has displaced the throttle pedal greater than a reference amount (THL>REF), then to provide for more aggressive vehicle operation, the selected pull-away ratio will be at least one ratio lower than the pull-away ratio selected in the prior art.

This and other objects and advantages of the present invention will become apparent from a reading of the following description of the preferred embodiment taken in connection with the attached drawings.

BRIEF DESCRIPTION OF THE DRAWINGS

FIG. 2 is a schematic illustration of the control system of the semi-automatic transmission of the present invention.

FIG. 3A is a perspective view of the driver's manual shift control and display device.

FIG. 3B is an enlarged view of a portion of the display illustrated in FIG. 3A.

FIG. 4 is a schematic illustration, in flow chart format, of the present invention.

DESCRIPTION OF THE PREFERRED EMBODIMENT

Figure 1:
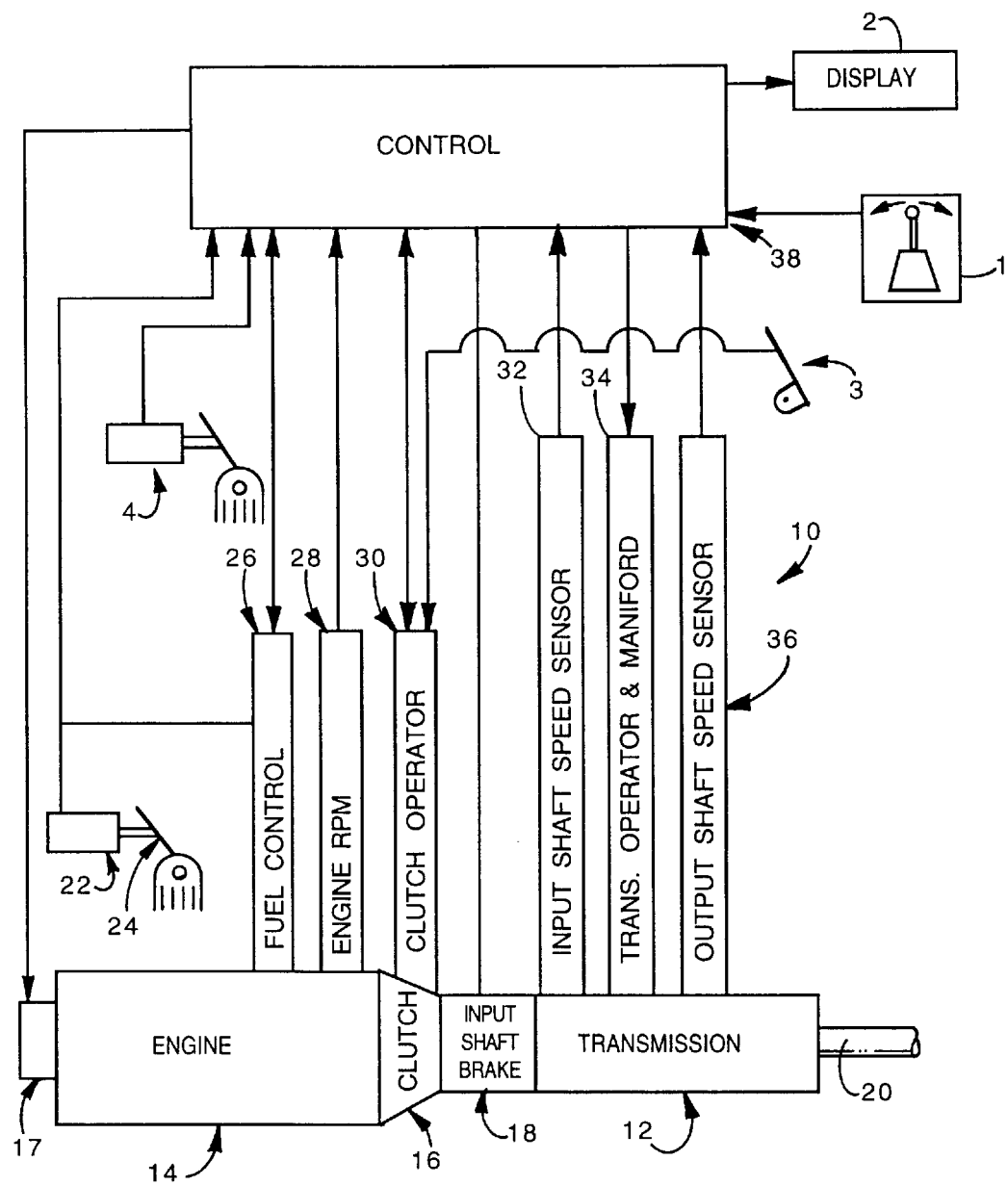
FIG. 1 is a schematic illustration of the semi-automatic mechanical change gear transmission system of the present invention.

In the present description of the preferred embodiment, certain terminology will be used for descriptive purposes only and is not intended to be limiting. The terms "upward," "downward," "rightward" and "leftward" will refer to directions in the drawings to which reference is made. The terms "inward" and "outward" refer to directions towards and away from, respectively, the geometric center of the device, or portion thereof, being described. The above applies to derivatives of the terms above specifically mentioned and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one and two ratios, respectively, from fourth and fifth speed, respectively, in the downshift direction.

The term "blocked transmission" or "blocked transmission section" shall designate a change gear constant mesh transmission or transmission section, wherein a selected one of a plurality of axially movable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196; 4,440,037 and 4,735,109, the disclosures of which are incorporated herein by reference.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that engine speed is an indication of transmission input shaft speed, and vice versa, especially if clutch 16 is nonslippingly engaged, while transmission output shaft speed is an indication of vehicle speed.

Control logic circuits, sensors, and actuators for the transmission system 10 as disclosed in FIGS. 1 and 2, may be as disclosed in U.S. Pat. No. 4,361,060, the disclosure of which is hereby incorporated by reference. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The central processing unit also sends command output signals to the display 2 to be described in greater detail below. The semi-automatic transmission system 10 additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Engine 14 may be electronically controlled and may communicate over an electronic data link conforming to SAE J1922, SAE J1939 and/or ISO 9141 protocols.

As may be seen by reference to FIG. 3A, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Referring to FIG. 3B, the display 2 includes upshift indicator section 2', downshift indicator section 2' and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change.

Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible.

However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permitable and as to which upshifts and downshifts are impermissible. Should the driver not heed the warning, the central processing unit 38 will not generate impermissible shift command even though synchronization of the mechanical jaw clutch elements could be obtained by the system.

When the upshift indication display 2' is blank, no upshift is allowed and the driver is probably driving at a very low economical engine RPM. Conversely, when the downshift indicator 2' is blank (i.e., has no horizontal lines displayed therein), no downshift is allowable, and maximum torque, acceleration or hill climbing will probably already be available in the system in its current engaged gear ratio. Gear shifts are always achieved without the operator manually engaging and/or disengaging the master clutch 16 by means of the mechanical manual clutch pedal 3, which is normally only used for starting from rest, reversing or for maneuvering in warehouses, etc., as vehicle clutches have traditionally been used.

To shift transmission 12, the driver moves lever 1 forward (for upshifts) and rearward (for downshifts) from the position illustrated in FIGS. 2 and 3A. To select a single upshift (i.e., a shift to seventh gear), the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1 A may be provided which button must be depressed prior to the central processing unit interpreting a backward movement of the control lever 1 when in the neutral position as a request for reverse operation. Of course, any type of toggle switch or button which may be located on the end of the shift lever may be utilized in place of reverse enable button 1A.

It is understood that a single control lever movable forward and backward in a given direction to select a forward and reverse mode of operation, and then movable in a transverse direction to select upshifts and downshifts either single or multiple, of the type disclosed in U.S. Pat. No. 4,442,730, the disclosure of which is hereby incorporated by reference, may be substituted for the control lever 1 illustrated.

The structure of a twelve forward speed splitter type transmission 12, and of the blocked jaw clutch members utilized in the auxiliary transmission section of transmission 12, is known in the prior art and may be appreciated in greater detail by reference to above mentioned U.S. Pat. Nos. 3,799,002; 3,921,469; 3,924,848; 4,194,410; 4,440, 037; and to published European Pat. Apps. EP-A-0071353 and EP-A-0117342.

The typical operation of the permissible ratio determination procedure and ratio change operating of the control system of the invention are now further explained.

The functions and components for the semi-automatic transmission are, gear ratio change selection switch or lever 1, display panel 2, control box 38, speed sensors 32, 36, engine (fuel) control 26, throttle and clutch sensors 22, 3 (detecting the driver's depression of them), electropneumatic control of shifts, clutch and brakes (using the engine manifold vacuum, together with a vacuum servo-follower if required), the input brakes 17 and/or 18 and their actuators, control cables, and the clutch actuator 30.

Referring to the items 1, 2 and central control unit 38, these input the driver's change requirements, tell him what gear he is in, which other ratios he can choose at any moment, including from rest, from sensed engine and vehicle status necessary to complete any gear shifts, either single or skip. Shifting is accomplished by the single or plural movement of the gear level 1, either forwards for upshifts or backwards for downshifts. The gear shift lever is spring biased to return to the rest or vertical position and one movement of the lever will instigate one shift control.

As an additional feature, as disclosed in aforementioned U.S. Pat. No. 4,930,078, if the operator allows the vehicle engine speed to fall below a reference value (such as the minimum engine speed providing acceptable torque level, such as below 800–1200 RPM for a typical heavy duty vehicle diesel engine) while the vehicle is in motion; as might occur in a congested traffic situation, or upon approaching a traffic circle or upon a hill; a single movement or pulse of lever 1 in the downshift direction will be interpreted as a request for automatic selection and engagement of an optimum pull-away ratio.

Briefly, an optimum pull-away ratio is a ratio which, at expected vehicle speed after completion of the downshift and reengagement of the master clutch (as a practical matter, this is generally equal to current vehicle speed) will result in an engine speed approximately midway between the maximum permitted (usually the governed) engine speed and the peak torque speed of the engine. For a typical diesel engine, the target engine speed is about 1700–1800 RPM.

By the above procedure, the vehicle operator can, with relative ease, request automatic selection and engagement of a transmission ratio providing relative smooth vehicle operation and good vehicle performance for pulling away from a temporary traffic slowdown.

To provide a more adaptive control, if the vehicle operator is indicating a desire for more aggressive vehicle performance by causing the vehicle throttle pedal 24 to be displaced by greater than a reference amount, such as by greater than 60% displacement (THL>REF$_{THL}$=60%), then the pull-away ratio selected, if allowable, will be at least one ratio lower than otherwise selected. The control of the present invention, in flow chart format, is illustrated in FIG. 4.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system (10) comprising a manual fuel throttle control (24), a fuel throttle controlled engine (14), a multi-speed change gear mechanical transmission (12), a friction master clutch (16) interposed the engine and transmission, a manually operated shift selection lever (1) movable in a first direction from a centered position to select upshifts and in a second direction from said centered position to select downshifts from the currently engaged gear ratio, a central processing unit (38) for receiving inputs indicative of transmission input shaft rotational speed, of vehicle speed, of engine speed, of currently engaged ratio, and of operation of said shift selection lever and for processing same according to predetermined logic rules to issue command output signals to non-manually controlled operators including a clutch operator (30), a fuel throttle control operator (26), and a transmission operator (34), said processing unit sensing operation of said manual shift selection lever including the direction of movement thereof and a number of displacements of said lever within a predetermined period of time from said centered position, said method including:

determining in a first mode of operation a transmission gear ratio selected by the operator to be shifted directly into from the currently engaged ratio by assuming each repetition of displacement from the centered position of said shift selection lever in a given direction indicates operator selection of a change of one additional consecutive ratio in said direction; and if vehicle speed is greater than a predetermined vehicle speed reference value and engine speed is less than a predetermined engine speed reference value, selecting automatically operation in a second mode of operation wherein a single displacement of said shift selection lever from the centered position in the second direction is interpreted as an operator selection of a downshift directly into an optimum pull-away transmission ratio, said method comprising:

if throttle position is less than a reference value, selecting the optimum pull-away ratio as the transmission ratio which, at expected vehicle speed after completion of a shift, will result in said engine rotating at an engine speed approximately midway between the predetermined maximum allowable engine speed and the peak torque speed of the engine; and if throttle position is greater than said reference value, selecting the optimum pull-away ratio as one ratio lower than the transmission ratio which, at expected vehicle speed after completion of a shift, will result in said engine rotating at an engine speed approximately midway between the predetermined maximum allowable engine speed and the peak torque speed of the engine.

2. A control for a semi-automatic mechanical change gear transmission system (10) comprising a manual fuel throttle control (24), a fuel throttle controlled engine (14), a multi-speed change gear mechanical transmission (12), a friction master clutch (16) interposed the engine and transmission, a manually operated shift selection lever (1) movable in a first direction from a centered position to select upshifts and in a second direction from said centered position to select downshifts from the currently engaged gear ratio, a central processing unit (38) for receiving inputs indicative of transmission input shaft rotational speed, of vehicle speed, of engine speed and of operation of said shift selection lever and for processing same according to predetermined logic rules to determined currently engaged gear ratio and to issue command output signals to non-manually controlled operators including a clutch operator (30), a fuel throttle control operator (26), and a transmission operator (34), logic rules causing said processing unit;

in a first mode of operation, to determine the transmission gear ratio selected by the operator to be shifted into from the currently engaged ratio by assuming each displacement from the centered position of said shift selection lever in a given direction indicates operator selection of a change in ratio in said direction; and in a second mode of operation causing said processing unit to interpret a single displacement of said shift selection lever from the centered position in the second direction as an operator selection of a downshift directly into an optimum pull-away ratio if vehicle speed is greater than a predetermined vehicle speed reference value and engine speed is less than a predetermined engine speed reference value; said system comprising logic effective to cause:

if throttle position is less than a reference value, selection of the optimum pull-away ratio as the transmission ratio which, at expected vehicle speed after completion of a shift, will result in said engine rotating at an engine speed approximately midway between the predetermined maximum allowable engine speed and the peak torque speed of the engine; and if throttle position is greater than said reference value, selection of the optimum pull-away ratio as one ratio lower than the transmission ratio which, at expected vehicle speed after completion of a shift, will result in said engine rotating at an engine speed approximately midway between the predetermined maximum allowable engine speed and the peak torque speed of the engine.

\* \* \* \* \*